(12) United States Patent
Wu et al.

(10) Patent No.: US 9,891,460 B2
(45) Date of Patent: Feb. 13, 2018

(54) SUBSTRATE FOR DISPLAY, DISPLAY PANEL AND DISPLAY DEVICE

(71) Applicant: BOE Technology Group Co., Ltd., Beijing (CN)

(72) Inventors: Yanbing Wu, Beijing (CN); Dongsheng Wang, Beijing (CN); Youmei Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 117 days.

(21) Appl. No.: 14/770,907

(22) PCT Filed: Mar. 18, 2015

(86) PCT No.: PCT/CN2015/074503
§ 371 (c)(1),
(2) Date: Aug. 27, 2015

(87) PCT Pub. No.: WO2016/061990
PCT Pub. Date: Apr. 28, 2016

(65) Prior Publication Data
US 2016/0349570 A1    Dec. 1, 2016

(30) Foreign Application Priority Data
Oct. 21, 2014    (CN) .......................... 2014 1 0564478

(51) Int. Cl.
*G02F 1/1335*    (2006.01)
*G02F 1/1368*    (2006.01)
(Continued)

(52) U.S. Cl.
CPC ...... *G02F 1/133504* (2013.01); *G02B 6/0011* (2013.01); *G02F 1/1368* (2013.01);
(Continued)

(58) Field of Classification Search
None
See application file for complete search history.

(56) References Cited

U.S. PATENT DOCUMENTS

2003/0067565 A1*    4/2003    Yamamura ........ G02F 1/133528
349/65
2006/0098140 A1*    5/2006    Lee ..................... G02B 5/3058
349/98
(Continued)

FOREIGN PATENT DOCUMENTS

CN    1412609 A    4/2003
CN    101126821 A    2/2008
(Continued)

OTHER PUBLICATIONS

Sep. 5, 2016—(CN)—First Office Action Appn 201410564478.7 with English Tran.
(Continued)

*Primary Examiner* — Ryan Crockett
(74) *Attorney, Agent, or Firm* — Banner & Witcoff, Ltd.

(57) ABSTRACT

A substrate for display, a display panel and a display device are provided. The substrate for display comprises a base comprising an upper surface and a lower surface which are opposite to each other. The lower surface of the base is formed with scattering microstructures, and the upper surface of the base is formed with a layer structure for display, thereby achieving ultrathin appearance and low cost of the display device.

13 Claims, 3 Drawing Sheets

(51) Int. Cl.
*F21V 8/00* (2006.01)
*G02F 1/1333* (2006.01)

(52) U.S. Cl.
CPC .. *G02F 1/133512* (2013.01); *G02F 1/133514* (2013.01); *G02F 1/133528* (2013.01); *G02F 1/133553* (2013.01); *G02F 1/133606* (2013.01); *G02F 2001/133302* (2013.01); *G02F 2001/133548* (2013.01); *G02F 2201/121* (2013.01); *G02F 2201/123* (2013.01)

(56) References Cited

U.S. PATENT DOCUMENTS

| | | | |
|---|---|---|---|
| 2008/0309861 A1* | 12/2008 | Seki | G02F 1/133555 349/117 |
| 2009/0073691 A1 | 3/2009 | Shibasaki et al. | |
| 2009/0159786 A1* | 6/2009 | Yang | G06F 3/042 250/227.29 |
| 2010/0208178 A1* | 8/2010 | Hayano | G02F 1/133512 349/106 |
| 2011/0090672 A1* | 4/2011 | Zhu | G02B 6/0018 362/97.1 |
| 2011/0109839 A1* | 5/2011 | Zhu | G02F 1/133603 349/62 |
| 2013/0094243 A1* | 4/2013 | Wu | G02B 6/0036 362/606 |
| 2013/0242226 A1* | 9/2013 | Jeong | G06F 1/1637 349/58 |
| 2014/0092334 A1* | 4/2014 | Ishikawa | G02F 1/133512 349/42 |
| 2014/0327859 A1 | 11/2014 | Momose et al. | |
| 2015/0160529 A1 | 6/2015 | Popovich et al. | |
| 2015/0183955 A1* | 7/2015 | Deno | G03F 7/0007 349/110 |
| 2016/0349570 A1 | 12/2016 | Wu et al. | |
| 2016/0377911 A1* | 12/2016 | Wu | G02F 1/133504 349/106 |

FOREIGN PATENT DOCUMENTS

| | | |
|---|---|---|
| CN | 101514781 A | 8/2009 |
| CN | 102354067 A | 2/2012 |
| CN | 102998841 A | 3/2013 |
| CN | 103309083 A | 9/2013 |
| CN | 103631050 A | 3/2014 |
| CN | 104110650 A | 10/2014 |
| CN | 104280933 A | 1/2015 |
| CN | 104536202 A | 4/2015 |
| JP | 2013097954 A | 5/2013 |
| KR | 20080038923 A | 5/2008 |
| TW | 201409118 A | 3/2014 |

OTHER PUBLICATIONS

Jun. 29, 2015—International Search Report and Written Opinion Appn PCT/CN2015/074503 with English Tran.
Apr. 19, 2017—(CN) Third Office Action Appn 201510026122.2 with English Tran.
Feb. 15, 2017—(CN) Second Office Action Appn 201410564478.7 with English Tran.
Mar. 2, 2017—U.S. Office Action U.S. Appl. No. 14/905,408.
Oct. 13, 2015—(WO) International Search Report and Written Opinion Appn PCT/CN2015/081986.
Feb. 5, 2016—(CN) First Office Action Appn 201510026122.2 with English Tran.
Oct. 10, 2016—(CN) Second Office Action Appn 201510026122.2 with English Tran.
Jun. 30, 2017—U.S. Notice of Allowance and Fees Due U.S. Appl. No. 14/905,408.

* cited by examiner

| Angle (degree) | Height/Bottom surface radius of the cone (mm/mm) | Light Flux (lumen) |
| --- | --- | --- |
| 53 | 1/0.5 | 0.028195 |
| 60 | 0.86/0.5 | 0.033313 |
| 90 | 0.5/0.5 | 0.037269 |
| 100 | 0.4/0.5 | 0.037395 |
| 120 | 0.3/0.5 | 0.037091 |
| 140 | 0.2/0.5 | 0.023055 |
| 150 | 0.13/0.5 | 0.009845 |

SUBSTRATE FOR DISPLAY, DISPLAY PANEL AND DISPLAY DEVICE

The application is a U.S. National Phase Entry of International Application No. PCT/CN2015/074503 filed on Mar. 18, 2015, designating the United States of America and claiming priority to Chinese Patent Application No. 201410564478.7 filed on Oct. 21, 2014. The present application claims priority to and the benefit of the above-identified applications and the above-identified applications are incorporated by reference herein in their entirety.

TECHNICAL FIELD

Embodiments of the present disclosure relate to a substrate for display, a display panel and a display device.

BACKGROUND

At present, LCD (Liquid Crystal Display) has been widely used in daily life. It is well known that liquid crystal does not have a light emitting characteristic and therefore it is necessary for the LCD to use a backlight source to implement display. Nowadays, side-type backlight sources prevail for medium/small size display devices.

A side-type backlight source generally comprises a light guide plate and an illuminator which is disposed at a lateral side of the light guide plate. Since the illuminator is typically a linear light source such as a Cold Cathode Fluorescent Light (CCFL), or a spot light source such as a Light-Emitting Diode (LED), the light guide plate is mainly used to convert the linear light source or the spot light source into a surface light source so as to improve luminance uniformity of the backlight source and thus improve displaying effect of the display device.

SUMMARY

At least one embodiment according to the present invention provides a substrate for display, which comprises a base comprising an upper surface and a lower surface which are opposite to each other. The lower surface of the base is formed with scattering microstructures, and the upper surface of the base is formed with a layer structure for display.

At least one embodiment according to the present invention provides a display panel, which comprises an upper substrate and a lower substrate which are to be cell-assembled. The lower substrate is the substrate for display mentioned above. The upper surface of the base of the substrate for display is adjacent to the upper substrate, and the layer structure for display comprises a polarizing layer.

At least one embodiment according to the present invention provides a display device, which comprises an illuminator and the display panel according to the embodiments of the present invention, wherein the illuminator is located at a lateral side of the base or below the base.

BRIEF DESCRIPTION OF THE DRAWINGS

A detailed description of the embodiments of the present invention is given hereinafter in connection with the drawings, so that those skilled in the art would understand the present invention in a clearer manner. Wherein.

DETAILED DESCRIPTION

Technical solutions of the embodiments of the present invention are clearly and thoroughly described below with reference to the drawings of the embodiments of the present invention. It is obvious that the described embodiments are just a part but not all of the embodiments of the disclosure. Based on the described embodiments herein, those skilled in the art can obtain other embodiment(s), without any inventive work, which should be within the scope of the disclosure.

It should be noted that terms of "upper" and "lower" as described in the embodiments of the present invention are based on the direction in which light travels. A layer structure or a film through which light passes at first is located at a lower position and a layer structure or a film through which light passes thereafter is located at an upper position.

Figure 1:
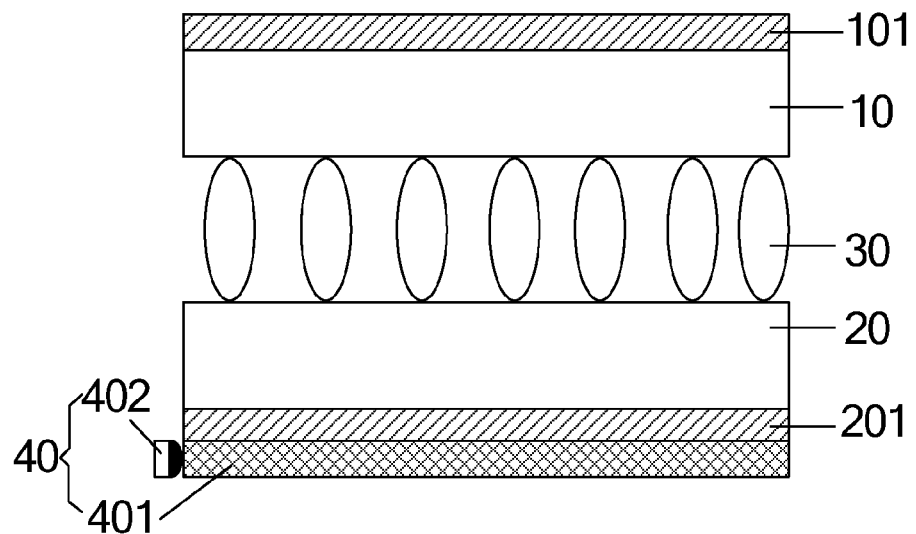
FIG. 1 is a schematic structural view of a display device.

As noted by the inventor, as illustrated in FIG. 1, a display device mainly comprises an upper substrate 10, a lower substrate 20, liquid crystals 30 disposed between the upper substrate 10 and the lower substrate 20, and a backlight source 40 positioned under the lower substrate 20. An upper polarizer 101 is disposed above the upper substrate 10 and a lower polarizer 201 is disposed under the lower substrate 20. The backlight source 40 comprises a light guide plate 401, and light emitting diodes 402 disposed at a lateral side of the light guide plate 401. Light emitted from the light emitting diodes 402 enters the light guide plate 401 from the lateral side of the light guide plate 401, and then is converted into a surface light source after being reflected several times and is emitted from an upper surface of the light guide plate 401 and is irradiated onto the lower substrate 20.

In the above display device, the light guide plate is relatively thick and is costly. Due to restricted space, strict cost control by manufacturers and rigorous requirement by users on portability, it is difficult for such a display device to meet the requirements of ultrathin appearance and low cost.

Figure 2:
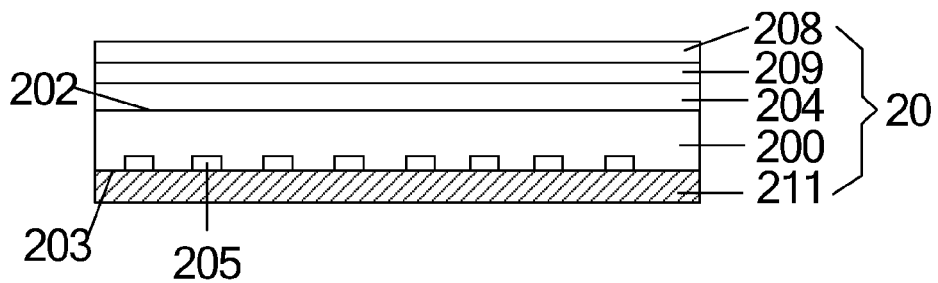
FIG. 2 is a schematic structural view of a substrate for display according to an embodiment of the present invention.

An embodiment of the present invention provides a substrate for display. As illustrated in FIG. 2, the substrate for display includes a base 200 comprising an upper surface 202 and a lower surface 203 which are opposite to each other. The lower surface 203 of the base 200 is formed with scattering microstructures. The upper surface 202 of the base 200 is formed with layer-structures for display, which can be layer-structures such as a polarizing layer 204 and an array layer 208 as illustrated in FIG. 2.

It should be noted that the substrate for display can serve as an array substrate of a display panel or a color filter substrate of a display panel. If the substrate for display is an array substrate, the corresponding layer-structures for display can comprise thin film layer-structures such as a polarizing layer, a thin film transistor and a pixel electrode layer. If the substrate for display is a color filter substrate, the corresponding layer-structures for display can comprise layer-structures such as a color film layer and a black matrix.

The substrate for display is formed with scattering microstructures on the lower surface of the base, and thus light which is incident from the lower surface or a lateral side of the base is scattered after being irradiated onto the scattering microstructures and thus becomes a surface light source, and then is emitted from the upper surface. Luminance of the emitted light is more uniform.

Figure 3:
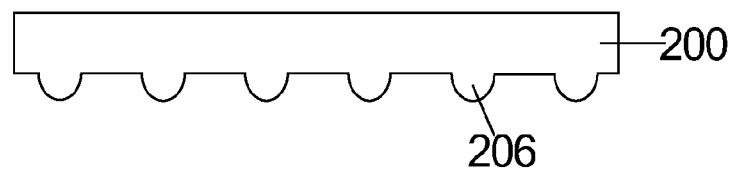
FIG. 3 is a schematic view of scattering microstructures in FIG. 2 which is in a form of protrusions.
Figure 4:
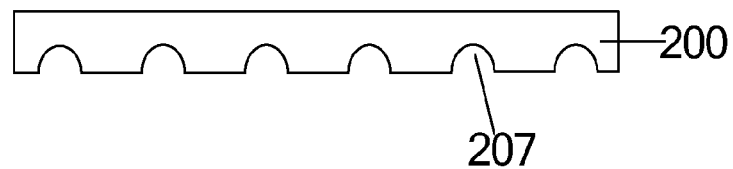
FIG. 4 is a schematic view of scattering microstructures in FIG. 2 which is in a form of grooves.
Figures 5, 6:
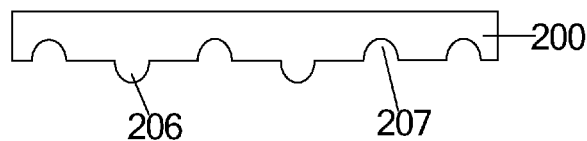
FIG. 5 is a schematic view of scattering microstructures in FIG. 2 which is in a form of protrusions and grooves.
FIG. 6 is a numerical value chart of light flux of conical grooves having various vertex angles.

For example, the scattering microstructures are protrusions and/or grooves. As illustrated in FIG. 3, the scattering microstructures of the substrate for display can be protrusions 206. Alternatively, as illustrated in FIG. 4, the scattering microstructures can be grooves 207. Or alternatively, the scattering microstructures can be protrusions 206 and grooves 207, as illustrated in FIG. 5. It should be noted that the protrusions and the grooves can be in an order of nanometer or in an order of millimeter. Compared with protrusions and grooves in an order of millimeter, protrusions and grooves in an order of nanometer make a more uniform scattering.

If the scattering microstructures are grooves in an order of nanometer, the scattering microstructures can be formed into the grooves in an order of nanometer by means of "nano-etching", i.e., by means of etching using etchant. If the scattering microstructures are protrusions in an order of nanometer, the protrusions can be formed by directly printing particles on the lower surface of the base.

For example, to improve scattering property of the scattering microstructures, if the scattering microstructures are grooves, the grooves can be filled with material having a refractive index different from that of the base. If the scattering microstructures are protrusions, refractive index of the protrusions can be the same as that of the base or can be different from that of the base.

For example, to reduce processing difficulty, the protrusions or the grooves can be hemisphere-shaped or conical-shaped.

For example, if the protrusions or the grooves are conical-shaped, the vertex angle of the cone is ranged from 90° to 132°. In case that conical protrusions or grooves have vertex angles in a range of 90° to 132°, light is directly emitted from the upper surface of the base without any further reflection after being reflected by the protrusions or the grooves. In case that conical protrusions or grooves have other vertex angles, when light is reflected toward the upper surface by the protrusions or grooves, a part of the light will be subjected to total reflection and be reflected back into the base. Such a part of light, when being directed to a lateral side of the base, will be directly emitted therefrom, which causes a loss of light energy.

Conical grooves are exemplified to explain the above result. For example, the base has a size of 30 mm×20 mm×0.4 mm and is made of PMMA (polymethyl methacrylate). A lateral side of the base is provided with nine LEDs, each having a size of 0.4 mm×0.4 mm×0.1 mm. FIG. 6 illustrates light flux received by a receiving surface in case of various conical grooves having different vertex angles. As can be seen in FIG. 6, when the vertex angle of a cone is 90°, 100° and 120°, a total light flux received by the receiving surface is nearly the most. That is to say, when a vertex angle of a cone is ranged from 90° to 132°, light scattering effect is the best.

Figure 7:
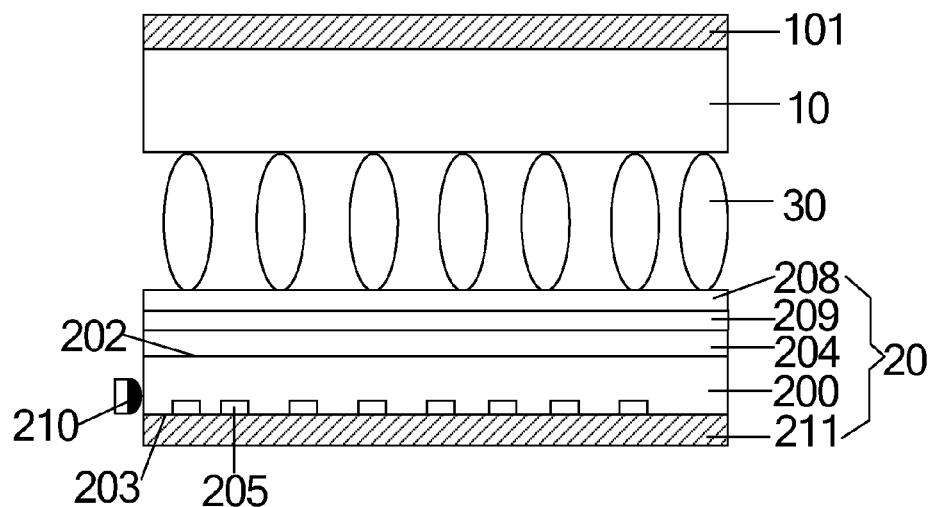
FIG. 7 is a schematic structural view of a display device according to an embodiment of the present invention.
Figure 8:
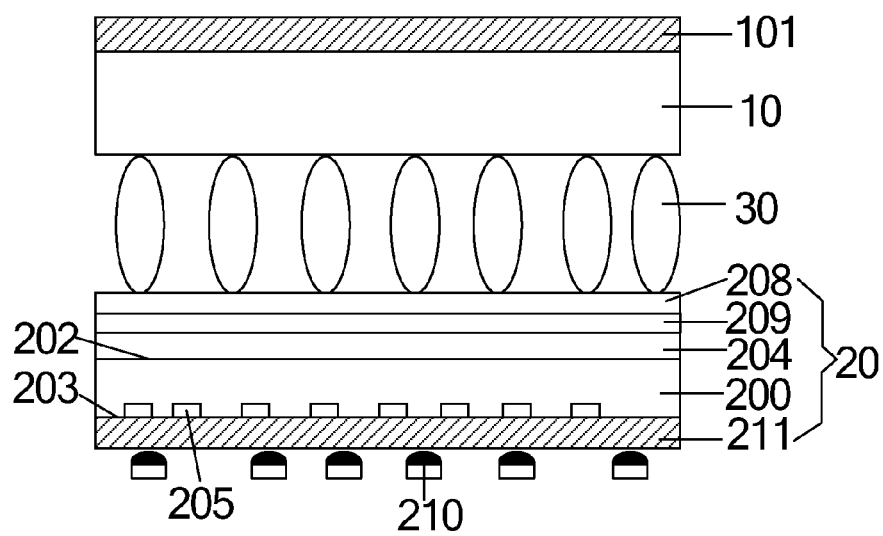
FIG. 8 is a schematic structural view of another display device according to another embodiment of the present invention.

As illustrated in FIG. 7 and FIG. 8, an embodiment of the present invention provides a display panel which comprises an upper substrate 10 and a lower substrate 20 which are to be cell-assembled. The lower substrate 20 is the substrate for display as described above. The lower substrate (the substrate for display) 20 comprises a base 200 having an upper surface 202 and a lower surface 203 which are opposite to each other. The upper surface 202 is adjacent to the upper substrate 10. The upper surface 202 of the base 200 is formed with layer-structures for display which includes a polarizing layer 204 (which can further includes an array layer 208). The lower surface 203 of the base 200 is formed with scattering microstructures 205.

It should be noted that the display panel can be for example a TN (Twisted Nematic) type display panel, an ADS (Advanced Super Dimension Switch) type display panel, or an IPS (In-Plane Switching) type display panel. But the present invention is not limited to this. At the same time, the layer-structures of the upper substrate and the lower substrate can be varied. For example, the upper substrate can comprise layer-structures of a black matrix layer and a common electrode layer. The lower substrate can comprise layer-structures of a polarizing layer, a thin film transistor, a pixel electrode layer and a passivation layer. Details are omitted here.

The lower substrate of the display panel has scattering microstructures formed on the lower surface of the base, so that light entered from the lower surface or a lateral side of the base is scattered after being irradiated to the scattering microstructures and becomes a surface light source, and then is emitted from the upper surface. Luminance of the emitted light is more uniform and thus the displaying effect of the display panel is better.

In the above display panel, the polarizing layer can be a polarizer directly affixed to the upper surface of the base or can be a polarizing film formed on the upper surface of the base. There is no specific requirement for the polarizing layer, as long as light entered into the polarizing layer can be converted into a polarized light.

For example, the polarizing layer can be formed by depositing a layer of metal such as Al (aluminum) on a base, then forming metallic wires with a width of 20 nm to 500 nm by etching, which metallic wires are arranged in parallel to form a grating and thereby forming a wire grating polarizing film. Compared with a polarizer affixed to the base, the thickness of the wire grating polarizing film is greatly reduced and thus the thickness of the display device is further reduced.

It should be noted that principle of the wire grating polarizing film is as follows. Electrons in the wire grating polarizing film can only move along the etched metallic wires. When light is irradiated onto the wire grating made of the metallic wires, libration of optical wave electric vectors in a direction of metallic wires will be absorbed by the electrons in the metallic wires, and thus electric vectors in a direction perpendicular to the metallic wires will pass through. Therefore, only photons along a longitudinal direction of the wire are absorbed, while photons in a lateral direction are not absorbed. Thus, linear polarization light is obtained.

In addition, to achieve display of the display panel, as illustrated in FIG. 7 and FIG. 8, an upper polarizer 101 is formed on the upper surface of the upper substrate 10. For example, the upper polarizer can be affixed to the upper surface of the upper substrate or can be formed between the upper substrate and the liquid crystals, but the present invention is not limited to this.

Alternatively, to control magnitude of an electric field between the upper substrate and the lower substrate so as to accomplish display of various gray levels, as illustrated in FIG. 7 and FIG. 8, the layer-structures for display further comprises an array layer 208 formed above the polarizing layer 204. For example, the array layer 208 can comprise other layer-structure such as a thin film transistor (not shown). As illustrated in FIG. 7 and FIG. 8, an insulation layer 209 is formed between the array layer 208 and the polarizing layer 204.

As illustrated in FIG. 7 and FIG. 8, an embodiment according to the present invention provides a display device which comprises an illuminator 210 and the display panel according to the embodiments of the present invention. The illuminator 210 is disposed on a lateral side of the base 200 (as illustrated in FIG. 7) or is disposed under the base 200 (as illustrated in FIG. 8).

For example, as illustrated in FIG. 7, when the illuminator 210 is disposed on a lateral side of the base 200, light emitted from the illuminator 210 enters into the base 200 from the lateral side of the base 200 and thus a side-type display device is formed. Such a display device has a characteristic of low cost and small volume. It should be noted that the locations of the illuminator at the lateral side of the base and the number of the illuminator can be varied. For example, the illuminator can be located on one lateral side of the base or can be located on two opposite lateral sides of the base. The present invention is not limited to this.

As illustrated in FIG. 8, when the illuminator 210 is located under the base 200, light emitted from the illuminator 210 enters into the base 200 through the lower surface 203 of the base 200 and thus a direct-type display device is formed. Such display device has a characteristic of high resolution and uniform luminance.

It should be noted that the illuminator can be a linear light source for example CCFL, or a spot light source for example LED, or a light source of other type, but the present invention is not limited to this.

The above display device is mainly used in the field of liquid crystal display. As illustrated in FIG. 7 and FIG. 8, liquid crystal 30 can be formed between the upper substrate 10 and the lower substrate 20. However, the present invention is not limited to this, but such display device can be served as any display device where a backlight source is required.

The above display device is formed with scattering microstructures on the lower surface of the base of the lower substrate, so that light from the illuminator which enters the base is scattered and becomes a surface light source, and is emitted from the upper surface of the base and goes into the polarizing layer. Therefore, the display device does not require a light guide plate. Compared with conventional techniques, thickness of the display device is reduced and production cost is decreased.

As illustrated in FIG. 7 and FIG. 8, for example, when the illuminator 210 is located on a lateral side of the base 200, the lower surface 203 of the base 200 is further formed with a reflection layer 211 covering the protrusions and/or the grooves. Therefore, the reflection layer 211 can reflect the light that will be emitted from the lower surface 203 of the base 200 back to the base 200, and thereby improving the luminance of the display device.

It should be noted that the reflection layer can be a reflector affixed to the lower surface of the base or can be a reflection film deposited on the lower surface of the base and covering the protrusions and/or the grooves. A reflector with a simple manufacturing process and a reflection film with a small thickness can be selected according to practical applications, and the present invention is not limited to this.

It should be further noted that the above reflection film can be made of material such as Al (aluminum), Ag (silver) and etc. At the same time, to prevent reflection film materials from being oxidized, an antioxidant layer can be formed on the reflection film materials.

For example, to improve efficiency of the illuminator and luminance of the display device, a reflection layer is disposed on lateral sides of the base other than the lateral side on which an illuminator is located. That is to say, if the illuminator is located on a lateral side of the base, a reflection layer can be disposed on each of the lateral sides of the base on which an illuminator is not located. If the illuminator is located under the base, a reflection layer can be disposed on all lateral sides of the base.

Embodiments of the present invention provide a substrate for display, a display panel and a display device which comprises an illuminator and the substrate for display according to the embodiments of the present invention. By forming scattering microstructures on the lower surface of the base of the substrate for display, light from the illuminator which enters the base is scattered and becomes a surface light source, and is emitted from the upper surface of the base and goes into the polarizing layer. Therefore, the display device does not require a light guide plate. Compared with conventional techniques, thickness of the display device is reduced and production cost is decreased.

The foregoing are merely exemplary embodiments of the present invention. However, the protection scope of the present invention is not limited to the above embodiments. Those skilled in the art can easily conceive modifications or variations in light of the disclosure of the present invention, which falls into the protection scope of the present invention. Therefore, the protection scope of the present invention shall be defined by the attached claims.

The present application claims priority of Chinese Patent Application No. 201410564478.7 filed on Oct. 21, 2014 and entitled "Substrate for Display, Display Panel and Display Device", the disclosure of which is hereby entirely incorporated by reference.

The invention claimed is:

1. A substrate for display, comprising a base, the base comprising an upper surface and a lower surface which are opposite to each other, the lower surface of the base being formed with a scattering microstructure including grooves and protrusions arranged alternately thereon to allow an incident light from the lower surface or from a lateral side of the base to become a surface light source after being irradiated and scattered onto the grooves and the protrusions, and the upper surface of the base being formed with a layer structure for display, wherein each of the protrusions or each of the grooves has a shape of a hemisphere or a shape of a cone, and a vertex angle of the cone is ranged from 90° to 132° to allow light to be directly emitted from the upper surface of the base without any further reflection being reflected by the protrusions or the grooves.

2. The substrate for display according to claim 1, wherein the grooves are filled with a material having a refractive index which is different from that of the base.

3. The substrate for display according to claim 1, wherein a vertex angle of the cone is 90°.

4. The substrate for display according to claim 1, wherein a vertex angle of the cone is 100°.

5. The substrate for display according to claim 1, wherein a vertex angle of the cone is 120°.

6. A display panel, comprising an upper substrate and a lower substrate which are to be cell-assembled, wherein the lower substrate comprises a base, the base comprising an upper surface and a lower surface which are opposite to each other, the lower surface of the base being formed with a scattering microstructure including grooves and protrusions arranged alternately thereon to allow an incident light from the lower surface or from a lateral side of the base to become a surface light source after being irradiated and scattered onto the grooves and the protrusions, and the upper surface of the base being formed with a layer structure for display, the upper surface of the base being adjacent to the upper substrate, and the layer structure comprising a polarizing layer, wherein each of the protrusions or each of the grooves has a shape of a hemisphere or a shape of a cone, and a vertex angle of the cone is ranged from 90° to 132° to allow light to be directly emitted from the upper surface of the base without any further reflection being reflected by the protrusions or the grooves.

7. The display panel according to claim 6, wherein the polarizing layer is a wire grating polarizing film.

8. The display panel according to claim 6, wherein the layer structure further comprises an array layer formed above the polarizing layer and an insulation layer formed between the array layer and the polarizing layer.

9. The display panel according to claim 6, wherein the upper substrate comprises a black matrix and a common electrode, the lower substrate comprises a polarizing layer, a thin film transistor, a pixel electrode layer and a passivation layer.

10. A display device, comprising an illuminator and a display panel, wherein the illuminator is located at a lateral side of or below a base of a substrate for display of the display panel, and the display panel comprises:

an upper substrate and a lower substrate which are to be cell-assembled, wherein the lower substrate comprises a base, the base comprising an upper surface and a lower surface which are opposite to each other, the lower surface of the base being formed with a scattering microstructure including grooves and protrusions arranged alternately thereon to allow an incident light from the lower surface or from a lateral side of the base to become a surface light source after being irradiated and scattered onto the grooves and the protrusions, and the upper surface of the base being formed with a layer structure for display, the upper surface of the base being adjacent to the upper substrate, and the layer structure comprising a polarizing layer, wherein each of the protrusions or each of the grooves has a shape of a hemisphere or a shape of a cone, and a vertex angle of the cone is ranged from 90° to 132° to allow light to be directly emitted from the upper surface of the base without any further reflection being reflected by the protrusions or the grooves.

11. The display device according to claim 10, wherein the illuminator is located at a lateral side of the base, and the lower surface of the base is formed with a reflection layer covering the scattering microstructure.

12. The display device according to claim 10, wherein a reflection layer is formed on a lateral side of the base on which the illuminator is not located.

13. The display device according to claim 12, wherein the reflection layer is made of Al.

* * * * *